Figure 1:
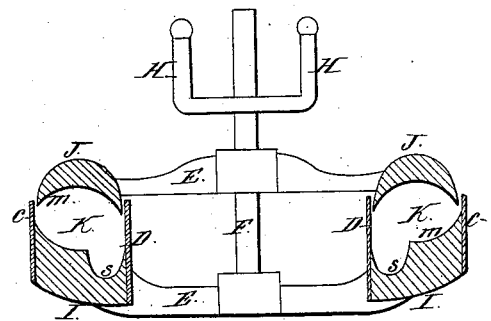
Figure 2:
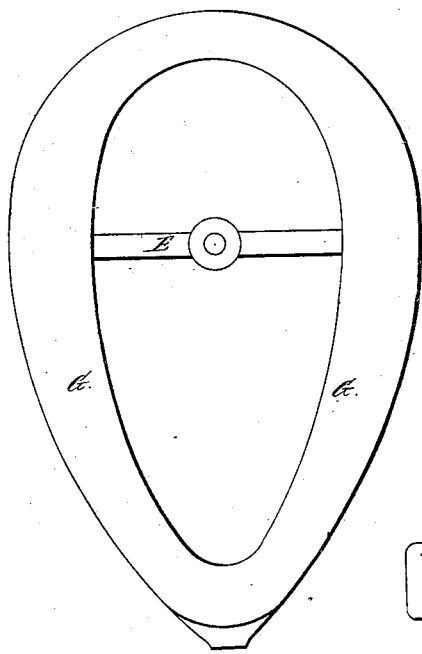
Figure 3:
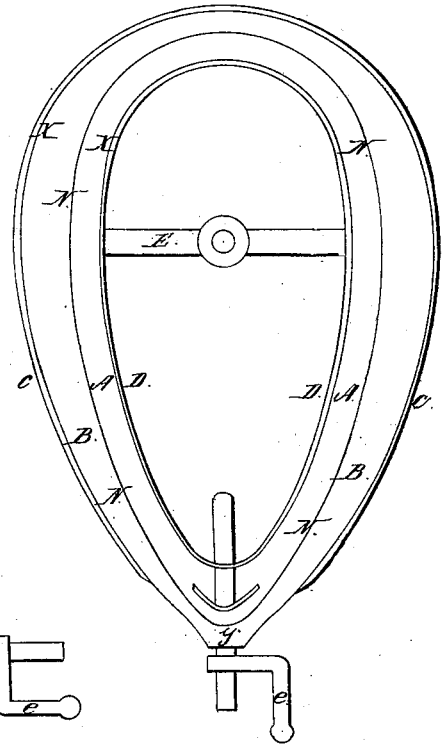
Figure 4:
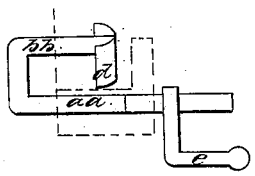

M. C. Chamberlin,
Horse-Collar Machine.

Nº 14,803.   Patented May 6, 1856.

Witnesses:
E B Forbush
N O Page

N. PETERS, PHOTO-LITHOGRAPHER, WASHINGTON, D. C.

UNITED STATES PATENT OFFICE.

MELVIN C. CHAMBERLIN, OF SHELDON, NEW YORK.

MOLD-PRESS FOR HORSE-COLLARS.

Specification of Letters Patent No. 14,803, dated May 6, 1856.

*To all whom it may concern:*

Be it known that I, MELVIN C. CHAMBERLIN, of the town of Sheldon, in the county of Wyoming and State of New York, have invented a new and Improved Mold-Press for the Manufacture of Horse-Collars; and I do hereby declare that the following is a full and exact description thereof, reference being had to the accompanying drawings and the figures and letters of reference marked thereon.

The nature of my invention consists in making a mold press in two parts, which will give shape, form and smoothness to the collar by compression.

To enable others skilled in the art to make and use my invention, I will proceed to describe its construction and operation.

I make my mold (and for the purposes of this description I will call it a mold press, for the manufacture of horse collars) in two parts, one of which I call the base mold, and the other the follower. The base mold is represented in Figure III, and the follower in Fig. II. These parts of the mold or either of them may be made of wood alone or of wood and metal combined or of metal alone. I prefer to make them of cast iron.

The interior of the base mold is made in the form of the rim of the collar, and the outside, (or that part upon which the hame rests). The follower is made in the form of the belly of the collar (or that part which comes in contact with the horse's neck and breast). The inside of the molds, represent the size, shape and form of the collar, and I cast the two parts of the mold in sand, from patterns as in the ordinary process of casting at the foundries, and then fit them up for use.

Several sizes may be used in the manufacture, so as to fit very large or very small horses, or horses of intermediate size. If made entirely of wood, the same care should be observed to obtain the proper form and sufficient strength.

A depression is made in the base mold, to form the rim of the collar, represented at A A, Fig. III. A depression less in depth but broader is also made to form the belly of the collar as represented at B, B. The base mold rises into two rims or flanges c c and D, D, between which rims the follower (Fig. II) passes as it is pressed down upon the collar. These rims may rise from three to six inches, more or less as desired.

If the mold is made partly of wood and partly of metal, the rims may be made of strong band iron or brass and fastened to the wood bed X X. A cross tie E, Figs. II and III, binds together the opposite sides of the base and follower and also receives and supports the compressing screw bolt F. Fig. I. The depression in the follower (represented at G G Fig. II) is exactly the form which the belly of the collar will take.

The collar, being stuffed, and put into the base mold Fig. III, the follower is put over it, the screw bolt F, passing through the cross tie E, the follower passes down between the two rims c c, D, D, and by means of the compression bolt F, the collar must be brought into shape, taking the form of the mold.

Fig. I gives a cross sectional view of both parts of the mold press. I, I, shows the bed mold or base and J, J, the follower or compressing part. K, K, shows the interior of the mold, or the form of the collar as cut off crosswise s, s, shows the rim of the collar and m, the belly. H, is the nut, which may be turned by hand to carry down the follower, and compress the collar.

A stretcher is connected with the base mold in order to graduate the length of the collar—take the wrinkles out of the leather, and render the collar smooth and even. This stretcher is formed of a rod of iron, with two bends at right angles, and forming parallel rods, the one being longer than the other. This stretcher is represented by Fig. IV. a, a, may represent the longer parallel rod, and b b, the shorter. On the longer is cut a screw thread, and on the end of the shorter, is a circular metal plate, to give form to the neck, while at the same time it stretches the collar. The longer rod a, a, passes through the base mold as represented at y, and the shorter rod passes through the rim D, D, and leaves the plate, d, to move across the space in the neck of the mold. When the collar is put into the mold the rods, a, a, b, b, are allowed to drop down so as to bring the plate d, to rest upon the rim D D. The plate d, is thus put below the neck of the collar and then by turning the hand nut e the collar may be stretched as much as desired and at the same time bring it into shape and take the wrinkles out of the leather.

By this process of molding and pressing the collar it is made even, smooth and of equal solidity in all its parts and perfectly fitted to the horse's neck.

That part of the base mold represented by the line N, N, N N is left full, or raised slightly in order that the rim and belly of the collar may not be pressed together, and also to form a bed or seat for the hame.

What I claim as my invention and desire to secure by Letters Patent is—

Giving shape and form to horse collars by means of a mold press, constructed and operated substantially as herein described.

M. C. CHAMBERLIN.

Witnesses:
H. O. PAGE,
CHAS. BENNETT.